United States Patent [19]
Bills et al.

[11] 3,943,842
[45] Mar. 16, 1976

[54] DEHYDRATOR

[76] Inventors: Jay P. Bills, 1136 E. 2200 North; Edward LeRoy France, 1975 N. 950 E., both of Logan, Utah 84321

[22] Filed: Aug. 19, 1974

[21] Appl. No.: 498,809

[52] U.S. Cl. ............... 99/473; 99/476; 99/482; 34/197
[51] Int. Cl.² ............... A23L 3/16; F26B 9/06
[58] Field of Search ............ 99/476, 331, 378, 450, 99/467–468, 473–474, 483–484; 4/131; 34/46, 192, 195, 197, 229, 231–232; 219/443, 445

[56] References Cited
UNITED STATES PATENTS

| | | | |
|---|---|---|---|
| 1,686,500 | 10/1928 | Whorff | 34/197 UX |
| 2,017,728 | 10/1935 | Oskamp | 34/197 |
| 2,357,946 | 9/1944 | Fuller | 34/197 |
| 2,642,860 | 6/1953 | Hunter et al | 34/197 X |
| 3,470,626 | 10/1969 | Pfeiffer | 34/46 |

*Primary Examiner*—Daniel Blum
*Assistant Examiner*—Arthur O. Henderson
*Attorney, Agent, or Firm*—Lynn G. Foster

[57] ABSTRACT

A cabinet dehydrator for long term preservation of food under close control of time temperature and humidity. Intake air is obtained from the surrounding atmospher and displaced into the dehydrator over electrical heating elements by a blower. This heated air is ported upwardly adjacent the shelves and thereafter normally laterally between the shelves. Baffles are manually set to control the amount of hot air displaced across a given shelf. Humidity controls function to regulate the rate at which moisture is caused to be withdrawn from the food being dehydrated.

10 Claims, 10 Drawing Figures

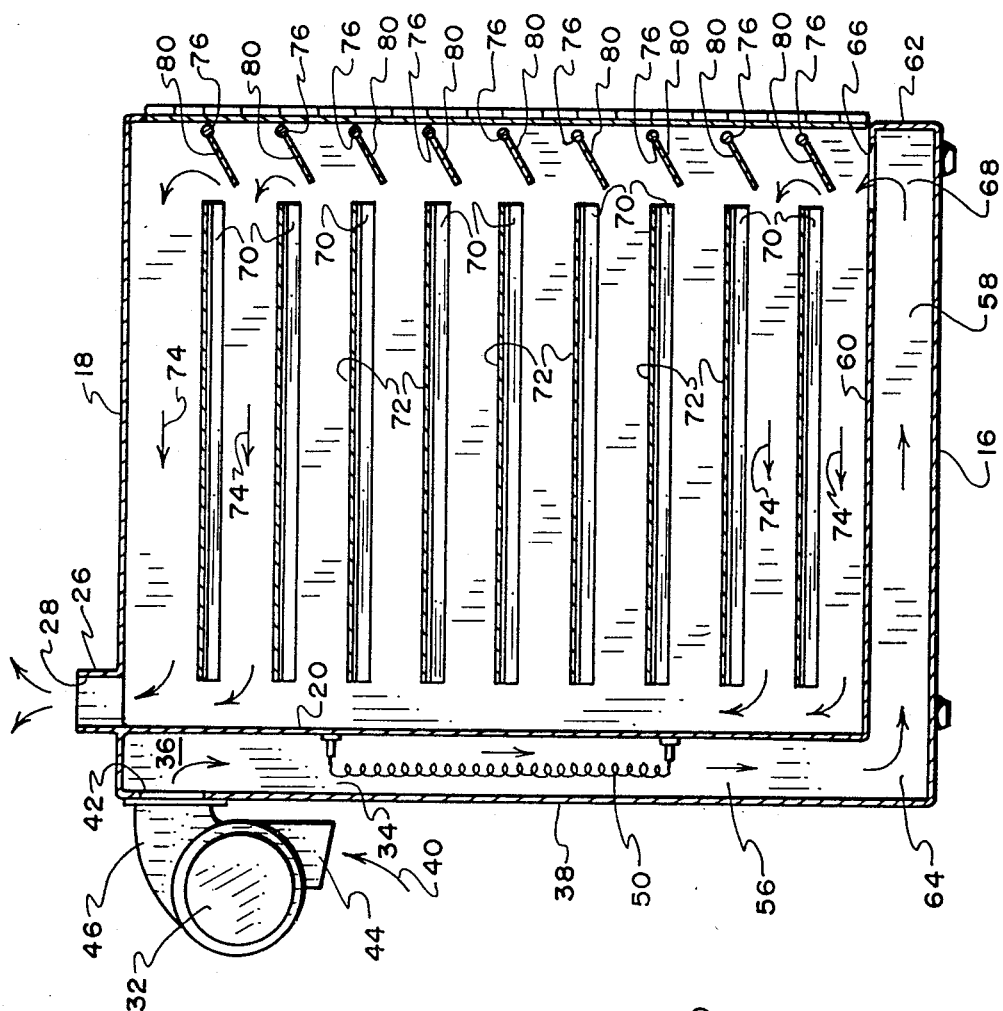
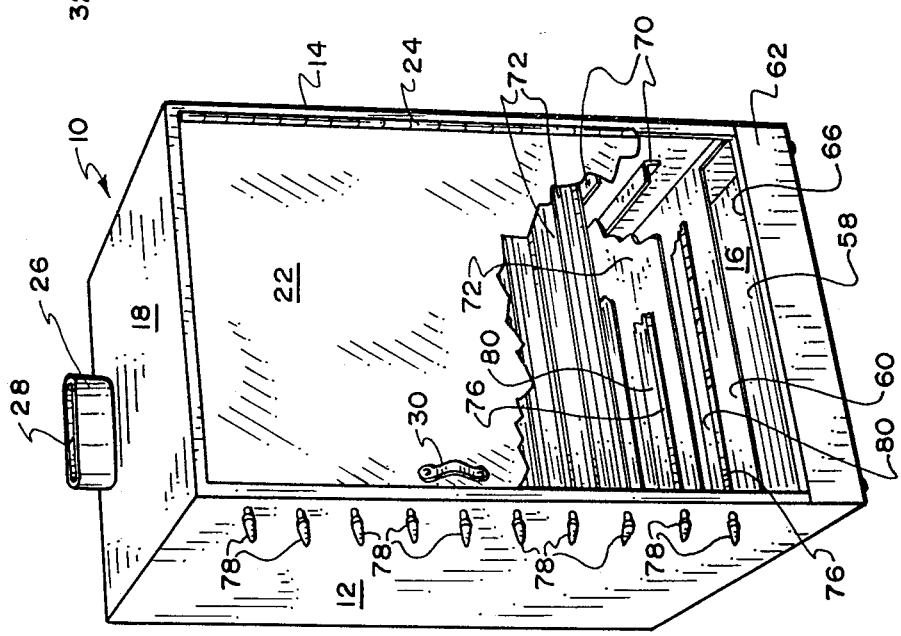
FIG. 2
FIG. 1

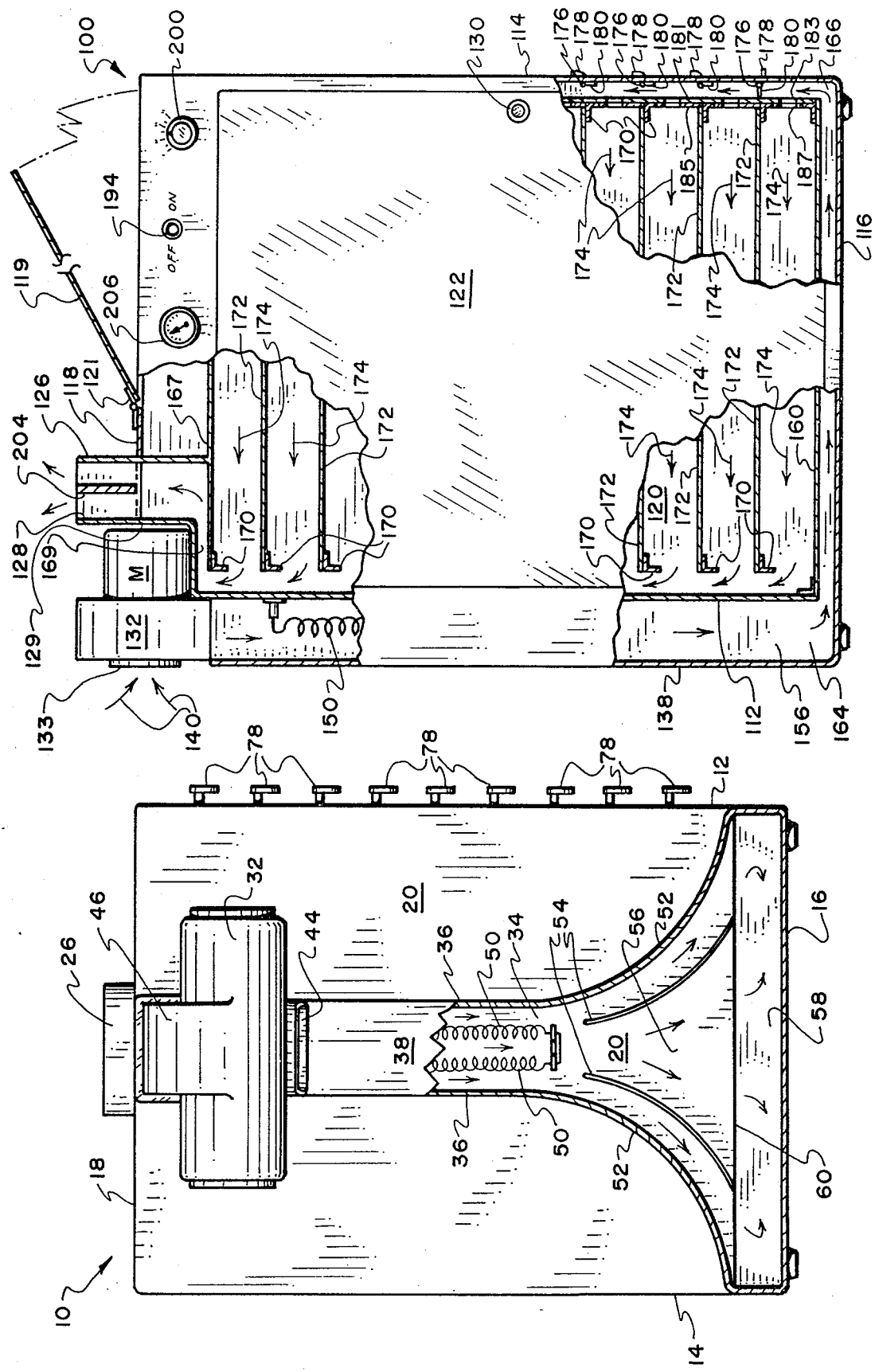

DEHYDRATOR

BACKGROUND

1. Field of Invention

The present invention relates generally to dehydration of food and more particularly to novel dehydrators and methods for home use in preserving food under close time, temperature and humidity restraints.

2. Prior Art

Prior art proposals for preservation of food through dehydration have included sun drying, kitchen oven drying and special equipment drying. Naturally, the time and temperature requirements will vary substantially depending upon the food being dehydrated and the type of equipment, if any, being used. Time and temperature data for a given food is normally determined empirically and there are a number of publications available indicating time and temperature conditions which produce the best results for a given meat, vegetable or fruit to be dehydrated. For example, see *Mountain Valley Book of Home Food Dehydrating* by Jay P. and Shirley S. Bills, 1973, which was printed by Keith W. Watkins, Logan, Utah. The end object in each case is to preserve food products in which so much of the product's natural moisture is removed that spoilage micro-organisms (yeasts, molds and bacteria), even though present in a living condition in the dehydrated product, are unable to grow or multiply.

Sun curing is as old as field cutting and drying of hay and has been applied to fruits, vegetables and meats for human consumption. The method, however, is the most unsatisfactory of those available since it demands a "rainless" season of bright sunshine and high temperature coincident with the period of time when the vegetable or fruit is at full maturity and not yet spoiled. If a succession of sunny days does not occur at the proper time, the fruits and vegetables will spoil.

Kitchen oven drying is also normally unsuitable because of poor ventilation and inability to properly control temperature at a sufficiently low range to produce dehydration without excessive vitamin loss. Also, precise control of humidity is impossible and air movement highly restricted.

Several special construction dehydrators have been proposed in the past. Each of those known to the Applicant has been inadequate in terms of the rate at which drying can be facilitated by dehydration of a given food while properly preserving color, flavor and quality; temperature control has been inadequate frequently resulting in incomplete drying and protracted time exposure or too high a temperature followed by excessive vitamin loss. Excessive air flow results in case hardening where the inner moisture is sealed and spoilage or inferior product results; and/or precise control of humidity conditions in the vicinity of the food being dehydrated and inadequate circulation of the air about the food has protracted dehydration or resulted in unacceptable or inferior dehydrated products.

BRIEF SUMMARY AND OBJECTS OF THE INVENTION

The present invention comprises novel home dehydrators, each preferred dehydrator comprising a cabinet with a blower, a heater for influent air, structure for strictly though selectively channeling hot air into contiguous relation with food upon one or more removable shelves and thereafter to exhaust, with controls for accurately setting, maintaining and monitoring temperature within a suitable range to efficiently dehydrate without excessive vitamin loss and for controlling the rate of air displacement at any point in time within the dehydrator thereby maintaining the best humidity level in the air adjacent the food, which must be substantially below saturation.

With the foregoing in mind, it is a primary object of the present invention to provide novel dehydrators for home utilization.

It is another paramount object of the present invention to provide a dehydrator capable of obtaining a uniform heat distribution at all points within the dehydrating chamber thereof so that all food therein will dehydrate at an even rate.

A further important object of the present invention is the provision of a dehydrator with controls to insure the retention of nutrients in dehydrated food.

It is a further significant object of the present invention to provide a dehydrator comprising a thermostatically controlled heater for influent air and structure for strictly though selectively channeling air into contiguous relation with food being dehydrated and thereafter to exhaust whereby dehydration is efficiently accomplished in a minimum amount of time.

It is another principal object of the present invention to provide a dehydrator with electronic feedback controls to accurately control time, temperature and humidity during dehydration of food.

These and other objects and features of the present invention will be apparent from the following detailed description, taken with reference to the accompanying drawings.

BRIEF DESCRIPTION OF DRAWINGS

FIG. 1 is a perspective representation of one presently preferred dehydrator embodiment according to the present invention, with parts broken away for the purpose of clarity;

FIG. 2 is a vertical cross section from front to back of the dehydrator of FIG. 1;

FIG. 3 is a rear elevation view, with parts broken away for clarity, of the dehydrator of FIG. 1;

FIG. 4 is a front elevation view of a second presently preferred dehydrator embodiment according to the present invention with parts broken away for purposes of clarity;

DETAILED DESCRIPTION OF THE ILLUSTRATED EMBODIMENTS

Figure 6:
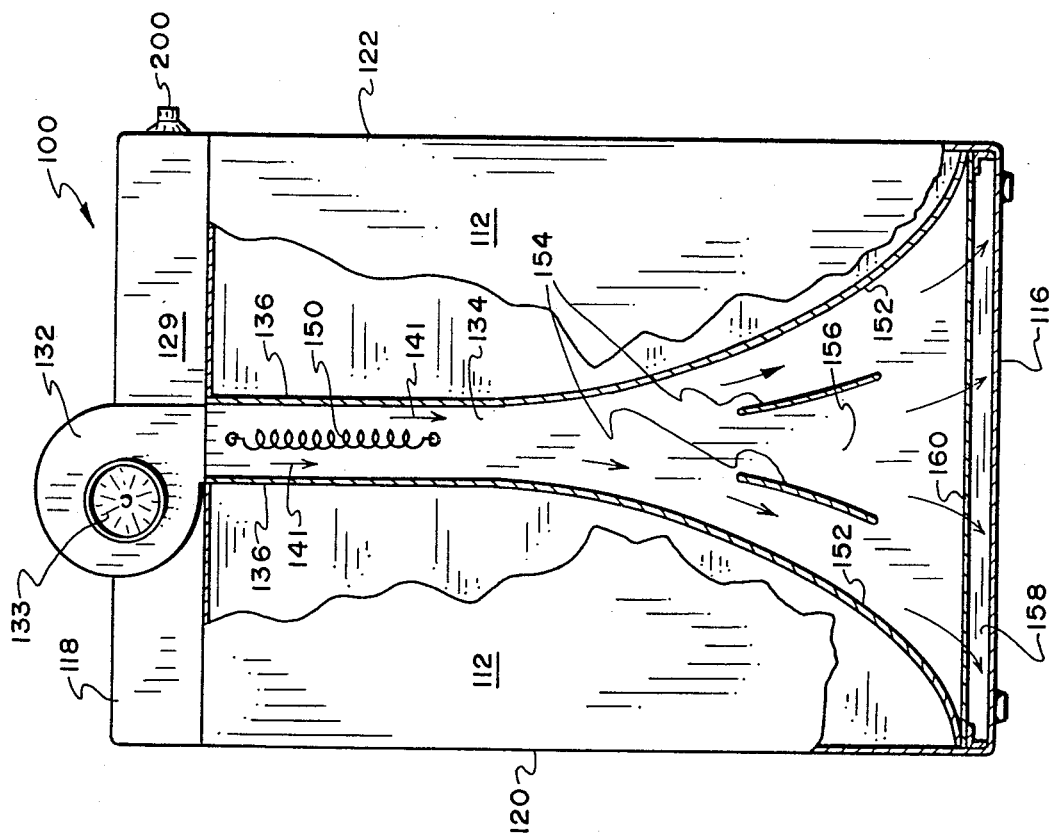
FIG. 6 is the other side elevational view of the dehydrator of FIG. 4.
Figure 5:
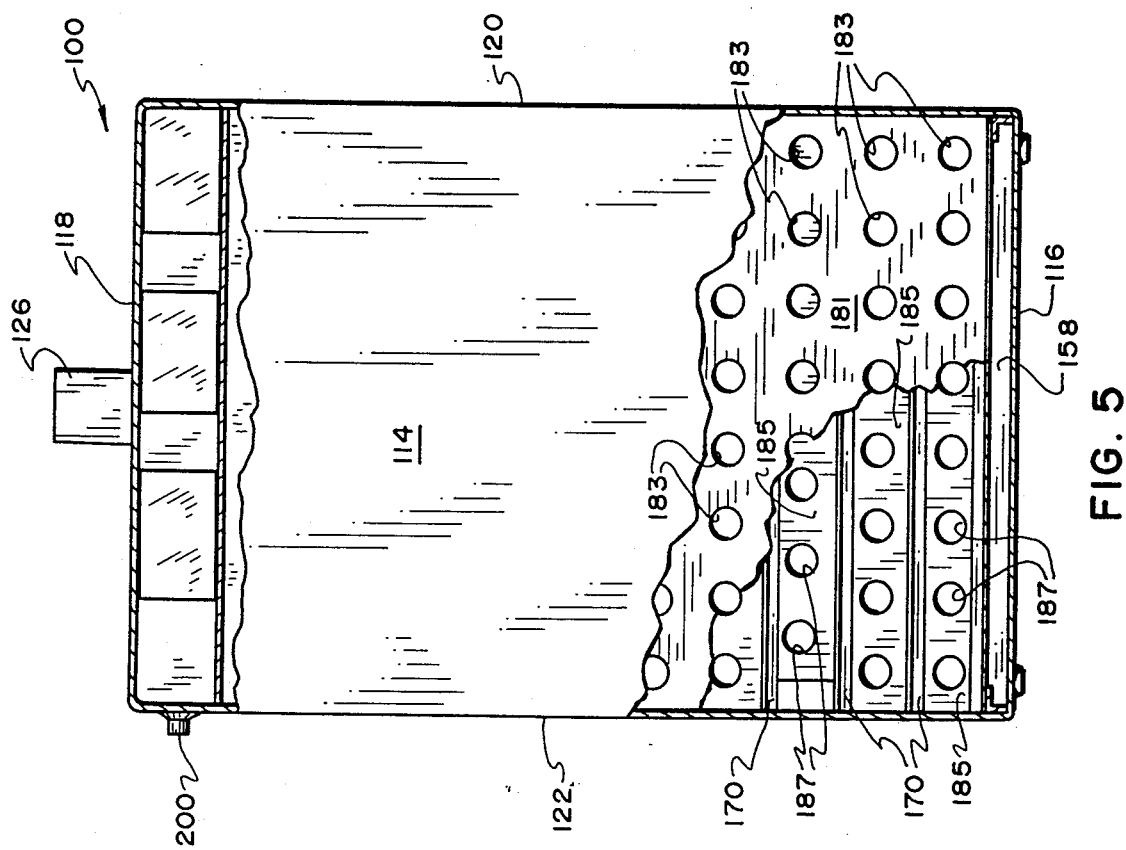
FIG. 5 is an elevation view of one side of the dehydrator of FIG. 4, with parts broken away for purposes of clarity.

Reference is now made to FIGS. 1–3 of the drawings wherein like numerals are used to designate like parts throughout. FIG. 1 illustrates in perspective a dehydrator 10 for home utilization. The dehydrator 10 comprises a cabinet comprising side walls 12 and 14, bottom wall 16, top wall 18, back wall 20 and a front, air-tight door 22 hinge connected to the side wall 14 at hinge 24. While the described components of the cabinet are illustrated as being of sheet metal, such can be appropriately insulated as desired or other suitable materials may be used in fabricating cabinet 10.

The top 18 of the cabinet comprises a chimney 26 which opens at port 28 to the atmosphere. Exhaust therefrom may, if desired, be suitably channeled from within the home or the like through any suitable structure such as a kitchen hood and exhaust system of conventional type. The unit may also be used outdoors.

The door 22 has a handle 30 for opening and closing the same to place food within or remove food from the interior of the cabinet of the dehydrator 10.

An influent air blower 32, which may be of conventional squirrel cage configuration with a variation speed motor, is mounted to a constricted air displacement channel 34, which is defined primarily by said back wall 20, opposed sides 36 and a rear cover 38. Air from the atmosphere as indicated by arrow 40, FIG. 2, is caused to be received into the constricted channel 34 through port 42 near the top thereof by operation of blower 32, the air entering the intake 44 of the blower and being discharged at conduit 46.

It is to be observed that one or more electrical heating elements 50 is disposed within the influent constricted channel 34. At essentially the lower end of the heating element or elements 50, the constricted channel 34 is downwardly progressively divergently enlarged by a flairing of the respective walls 36 as illustrated at 52 in FIG. 3. Baffles or diffusers 54 are disposed internal of the divergently enlarged chamber portion 56, the edges of the baffles 54 being connected respectively to the back wall 20 and the rear cover 38. As a result, the air displaced from the divergently enlarged chamber portion 56 into bottom chamber 58 is essentially uniformly diffused and of even temperature throughout the chamber 58. The chamber 58 is formed by a relatively narrow passageway defined by the bottom 16 of the cabinet, the side walls 12 and 14 together with a chamber top plate 60 with the top plate 60 spanning to and being connected with rear wall 20 and the bottom wall 16 spanning to and being connected with cover plate 38, as best illustrated in FIG. 2. A front face 62 closes the chamber 58, permitting ingress of heated air at intake port 64, which spans between side walls 12 and 14, and egress of heated air across the entire width of the cabinet at port 66 as illustrated by arrow 68 (FIG. 2).

Thus, the dehydrating interior of the cabinet is that space between top wall 18 and the bottom plate 60, and between the front door 22 and the rear wall 20 and between the two side walls 12 and 14.

A plurality of horizontally aligned shelf supports 70 are suitably rigidly mounted in opposite pairs to the side walls 12 and 14 respectively. These supports are illustrated as being in the nature of metal angles with the vertical leg thereof being attached to the associated wall and the other leg projecting inwardly in a horizontal plane. Removable shelves 72 rest respectively upon opposed supports 70. Said shelves 72 may be of suitable grating (porous) material permitting air to elevate in a generally vertical fashion from shelf to shelf together with or as a component of air displaced laterally across the space between two adjacent shelves, as hereinafter more fully explained. Each shelf may be covered with a net made from nylon. The openings permit air flow and the net prevents food such as bananas, summer squash, etc. from sticking to the shelf. Alternatively, each shelf 72 may be comprised of solid material such as sheet metal either with or without plastic coating, such as teflon, permitting air displacement between shelves along essentialy horizontal corridors only. This corridor displacement is illustrated by arrows 74 in FIG. 2. If desired some shelves may be solid (and some perforated) to prevent vertical movement of air from areas where potentially offensive food (e.g. food containing garlic) is being dried.

A damper shaft 76 is disposed in horizontal alignment with each shelf 72. Each damper shaft 76 is rotatably though snugly mounted to opposed side walls 12 and 14 and has an exterior handle 78 (FIG. 1) which may be manually manipulated to selectively set each of the cantilever damper blades 80 respectively mounted to damper shafts 76.

Thus, the operator of the dehydrator may individually select the angle at which each damper blade 80 is disposed to thereby either prohibit elevation of air vertically upward from port 66 beyond the adjacent shelf (by placing said damper plate 80 in horizontal alignment with the adjacent shelf) or at a suitable acute angle to control the amount of air permitted to be vertically elevated from port 66 to the next adjacent space between shelves. Consequently, for example, if food to be dehydrated were placed only on the bottom shelf, the second damper blade 80 could be set in a horizontal attitude to channel all of the influent heated air across the bottom shelf for the purpose of drying the food thereon. In addition, for example, if all of the shelves contained food, and upon examination, the food on the lower two shelves at a given point in time is nearly completely dehydrated whereas the food on shelves thereabove is progressively less dehydrated, the lower two dampers could be placed in a vertical orientation, the middle dampers at an angle greater to the horizontal than to the vertical and the top one or two dampers at an angle greater to the vertical than to the horizontal thereby increasing the amount of air reaching the elevated shelves and decreasing the amount of air distributed to the lower shelves.

Figure 8:
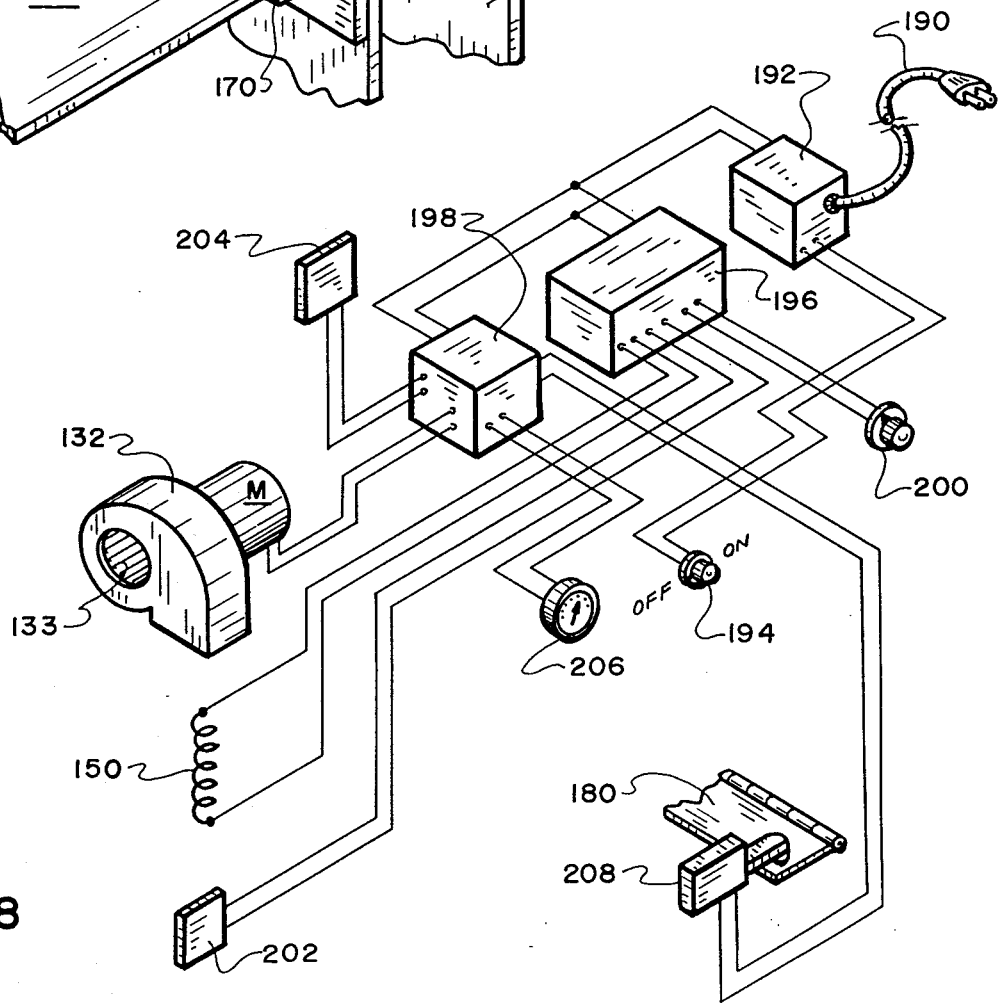
FIG. 8 is one suitable electrical system for the dehydrator of FIG. 4.

It is to be appreciated that the dehydrator 10 will comprise a thermostat by which the electrical element or elements 50 are controlled and some form of blower speed control for maintaining a suitable humidity within the dehydrating interior of the cabinet well below saturation. Suitable controls of this type are illustrated in FIG. 8 and will hereinafter be described in conjunction therewith. Dehydrating temperature should not exceed 145° F.

Reference is now made to the second disclosed dehydrator embodiment and illustrated in FIGS. 4–8, being there denominated by the numeral 100. The home dehydrator 100 comprises a cabinet comprising side walls 112 and 114, a bottom wall 116, a top wall 118, a back wall 120 and a front, air-tight door 122 hinge connected to the side wall 112. The mentioned wall construction may be of the type heretofore described in conjunction with the embodiment of FIGS. 1–3.

The top 118 of the cabinet comprises a chimney 126 which extends vertically upward and opens at port 128 to the atmosphere. The top 118 comprises an access lid 119 hinged to the remainder of the top at 121. See FIG. 4.

The door 122 has a handle 130 by which the door is opened and closed to accommodate food ingress and egress.

An influent air blower 132, which may be of conventional squirrel cage configuration having a variable speed motor M, is mounted to the dehydrator 100 along side wall 112 near the top thereof, a portion of the blower extending into cabinet recess 129. Air blower 132 causes introduction of influent air at port 133, the influent air being constricted through air displacement channel 134. Channel 134 is defined primarily by said side wall 112, opposed sides 136 and a rear cover 138. Air from the atmosphere, as indicated by arrows 140, is caused to be received into the constricted channel 134 and along the channel as indicated by arrows 141.

One or more electrical heating elements 150 is disposed within the channel 134 to cause elevation of the temperature of the influent air. The constricted channel 134 becomes downwardly progressively divergently enlarged immediately beyond the lower end of the heating element 150 as is shown at wall portions 152. Baffles or diffusers 154 are disposed internally of the chamber and its enlargement, the edges of the baffles 154 being connected respectively to the back wall 120 and the rear cover 138. As a result, the air displacement from the divergently enlarged chamber portion 156 into the bottom air chamber 158 is essentially uniformly diffused and of even elevated temperature throughout.

The chamber 158 is formed by a relatively narrow passageway defined by the bottom wall 116 of the cabinet, the front and back 120 and 122, and a chamber top plate 160, with the top plate 160 spanning to and being connected with side wall 114. Thus, heated air ingresses at intake port 164 of the chamber 158 and is distributed entirely across the width and length of the cabinet escaping from the chamber 158 through port 166 (FIG. 4).

The chimney 126 connects along its front to a concealed plate 167 and is integral therewith. The plate 167 is fixed in the illustrated position (see FIG. 4), and serves to define a narrow air effluent passage 169, by which air reaches the chimney 126.

Thus, the dehydrating interior of the cabinet is that space between the upper concealed plate 167, the bottom plate 160 and between the two side walls and the front and rear of the cabinet respectively.

A plurality of horizontally aligned shelf supports 170 are suitably rigidly mounted to the walls of the cabinet. These supports are in the nature of angles with one leg of each vertically aligned angle lying in a common vertical plane and the other leg lying in spaced horizontal planes each containing one opposed horizontal leg of two spaced angles. Removable shelves 172 rest by gravity upon opposed horizontal legs of each pair of supports 170. These shelves 172 may be of any suitable material such as grating or may be solid with or without suitable plastic coating, or some of each depending upon the utilization intended and particularly the need to specifically channel air in horizontal corridors to best dehydrate food. The corridor displacement is illustrated by arrows 174 in FIG. 4.

A damper shaft 176 is disposed in horizontal alignment with each shelf 172. Each damper shaft 176 is snugly rotatably mounted to the cabinet and has an exterior handle 178 (see especially FIG. 7), which may be manually manipulated to selectively set each of the cantilevered damper blades 180, one each being mounted to each damper shaft 176.

Thus, the operator of the dehydrator may individually select the angle at which each damper blade 180 is disposed to thereby either prohibit elevation of hot air vertically upward from port 166 beyond the adjacent shelf (by placing said damper plate 180 in horizontal alignment with the adjacent shelf) or at a suitable acute angle to control the amount of air permitted to be vertically elevated from port 166 to the next adjacent space between shelves.

Figure 7:
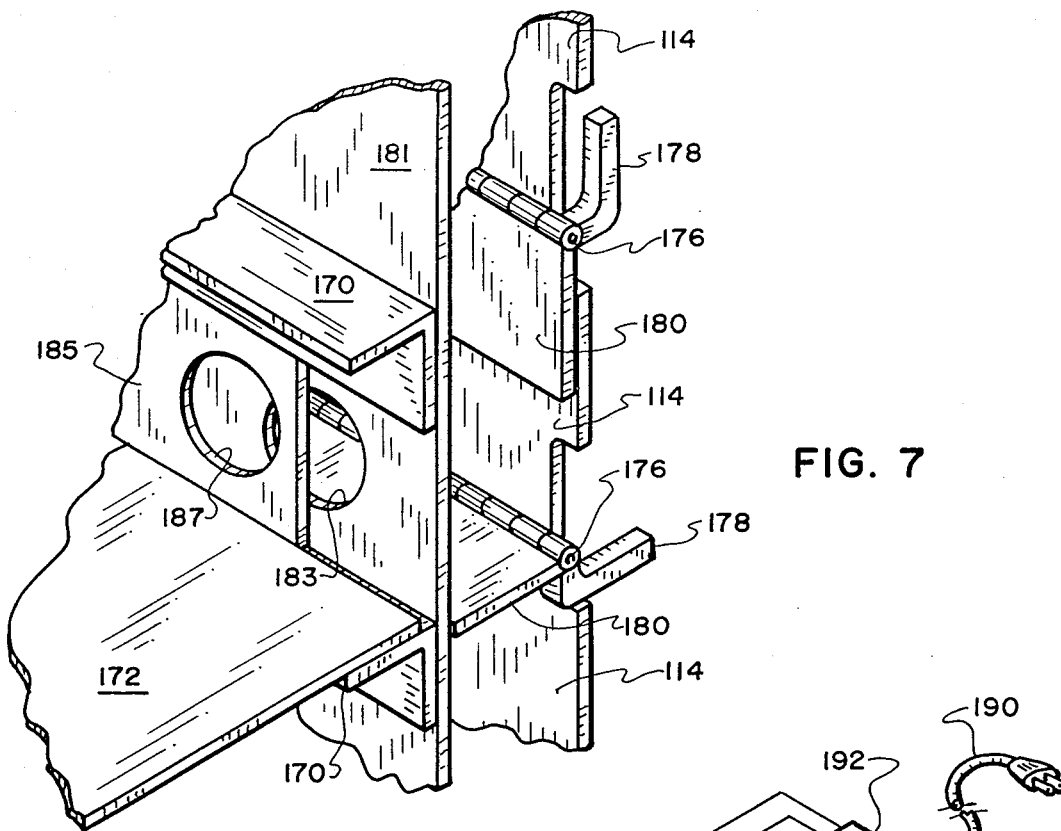
FIG. 7 is an enlarged fragmentary perspective representation of the air flow control mechanisms of the dehydrator of FIG. 4.

As is best evidenced from FIGS. 4 and 7, each space between adjacent shelves is closed at one side by a stationary vertical plate 181, each plate 181 having a plurality of circular openings 183 which in the absence of other constraints permit heated air issuing upward from port 166 to be introduced between any two shelves, depending upon the settings of the plurality of damper blades 180 inter alia.

A sliding plate 185 is disposed for front-back reciprocable displacement adjacent each stationary plate 181, being slightly less in length than the distance from the front to the back of the cabinet and spanning vertically between the lower edge of the vertical leg of the angle support 170 above the plate 185 and the top face of the next lower support 170, the shelves 172 being spaced from the plate 181 to accommodate the indicated movement. Thus, the door 122 may be opened and the sliding plates 185 selectively manually set so as to control the amount of overlap between apertures 183 in the plate 181 and adjacent apertures 187 in the sliding damper plate 185. Thus, the control of air displacement along the horizontal corridor between shelves is controlled not only by the setting of damper blades 180 but also the setting of sliding plates 185 in relation to stationary plates 181.

It is to be appreciated that any suitable conventional electrical control system may be utilized in conjunction with the dehydrators earlier described, the embodiment of FIG. 8 being one suitable form which may be used with the dehydrator 100. The dehydrator is intended to be used with household 110 volt electrical power using the cord 190. Cord 190 communicates electrical power to the master control 192 which is of conventional design and preferably contains a thermal circuit breaker to protect the entire electrical system. Also a relay may connect to a separate temperature sensor which senses the temperatures of the hot air being introduced into dehydrating chamber resulting in shut down of the dehydrator in the event said temperature exceeds a desired limit. The off/on switch 194, which is shown as being exposed, may be used to activate or inactivate control 192. When activated, the control 192 communicates electrical power to an air temperature control center 196 and to a blower motor control center 198 by use of conventional conductors. Air temperature control dial 200 may be used to manually establish a predetermined air temperature level for the dehydrator, the control 196 thereafter communicating in a selective fashion electrical energy to the heating element 150 to establish said temperature in a conventional fashion. The desired temperature is established by utilization of a temperature sensor 202 disposed at any suitable location within the dehydrator 100, the output of which controls the power to the heater elements or element 150 in accordance with the setting of dial 200.

A humidity sensor 204 communicates signals representative of humidity at the effluent chimney 126 to control center 198. Control center 198, in response thereto, controls the humidity within the dehydrator by controlling the rate at which the motor M of the blower 132 displaces air into the dehydrator, the humidity level at any point in time being indicated by humidity indicator 206. A micro-switch 208 is disposed adjacent each shelf in the path of the associated damper plates 180. The damper plate or plates, actuates the adjacent switch 208 communicating a signal to control 198 causing the RPM of motor M to be reduced a predetermined amount. When a given damper plate 180 is in the horizontal position, a micro-switch 208 senses said condition and communicates an electronic signal to the control center 198 causing an appropriate adjustment in the rate at which motor M rotates the blower 132.

Figure 9:
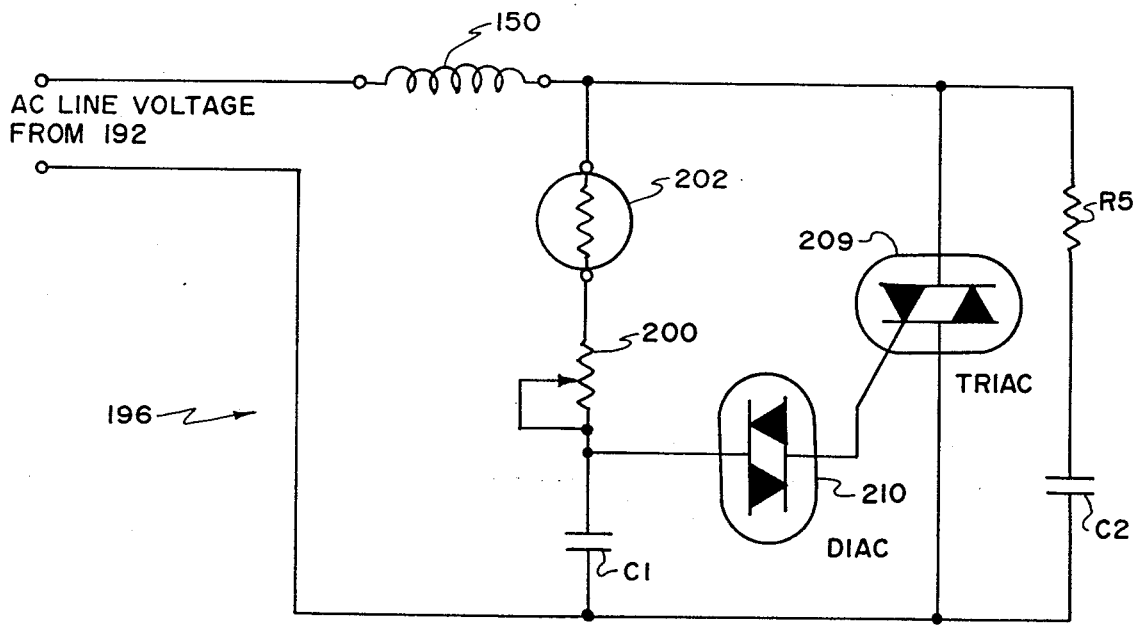
FIG. 9 is a presently preferred circuit diagram of the air temperature control center of FIG. 8.

Specific reference is made to the circuit diagram of FIG. 9 which illustrates the presently preferred solid state air temperature control circuit 196. The full wave diac-triac phase control network of circuit 196 determines the amount of electrical power supplied to heating element 150 which in turn determines the temperature of the heated air. On each successive half wave of AC line voltage input, capacitor C1 is caused to charge through the series resistances of temperature sensor 202 and manual temperature control potentiometer 200. At a given level of charge C1 causes diac 210 to conduct and trigger triac 209. As triac 209 triggers it effectively becomes a closed switch to provide a complete electrical circuit for heating element 150 thereby providing electrical power to that element. Air heated by element 150 is caused to flow around and passed temperature sensor 202. Any change in air temperature changes the resistance value of sensor 202 causing a change in charge time for capacitor C1. If the air temperature increases, temperature sensor 202 will increase in resistance thereby causing capacitor C1 to charge at a slower rate which in turn delays the conduction time of diac 210 and trigger time of triac 209 relative to the input AC waveform. Triggering triac 209 later in the waveform provides a reduced conduction period for electrical current to flow through heating element 150 thereby decreasing the power supplied to the element and reducing its temperature. This in turn reduces the air temperature until it reaches the stable temperature desired. Potentiometer 200 provides a manual adjustment for temperature selection by changing the resistance in the charge path of capacitor C1 which then functions as previously described to control air temperature. Resistor R5 and capacitor C2 serve to aid in turning off triac 209.

Figure 10:
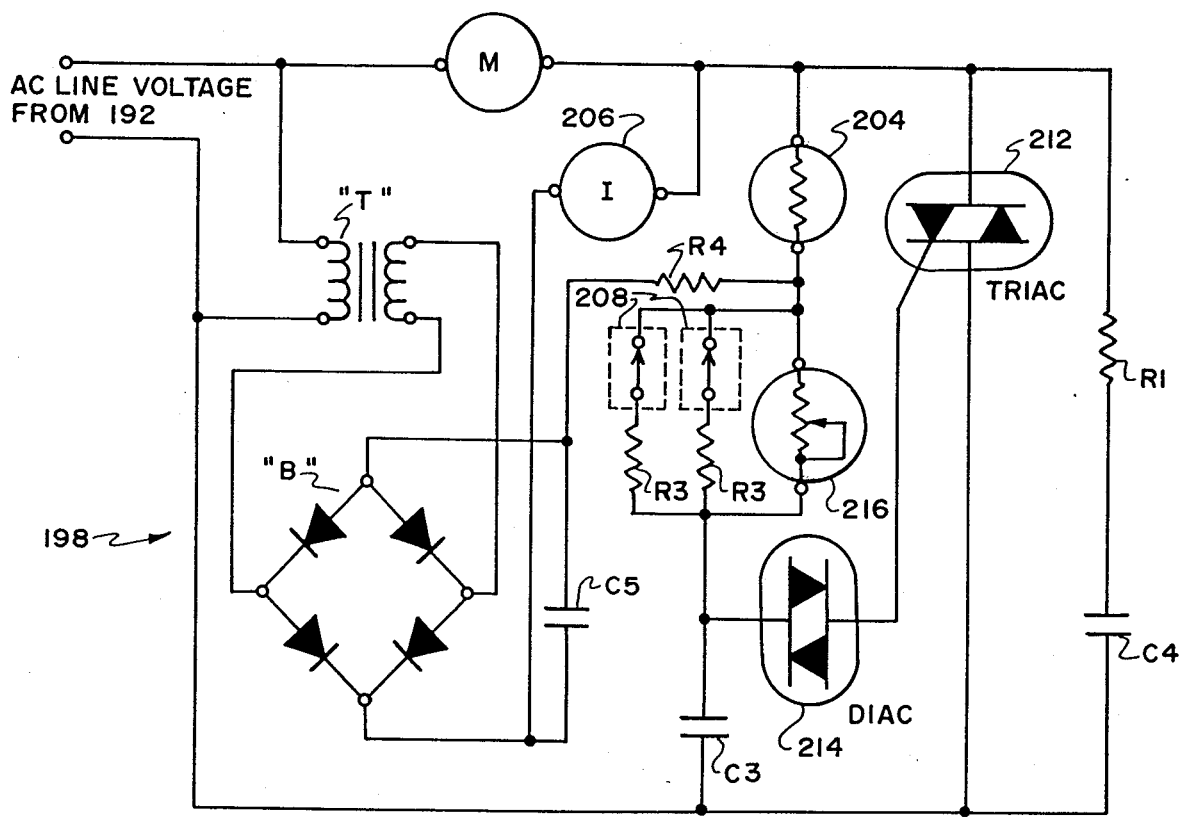
FIG. 10 is a presently preferred circuit diagram of the blower motor control center of FIG. 8.

Reference is made to the circuit diagram of FIG. 10, which illustrates a presently preferred solid state blower motor control center. The full wave diac-triac phase control network of circuit 198 determines the amount of electrical power supplied to blower motor M which in turn determines its speed and the air flow to the dehydrating unit. On each successive half wave of AC line voltage input, capacitor C3 is caused to charge through the series-parallel combination of resistors consisting of humidity sensor 204, micro-switch resistors R3 and potentiometer 216. At a given level of charge capacitor C3 causes diac 214 to conduct and trigger triac 212. As triac 212 triggers it effectively becomes a closed switch to provide a complete electrical circuit for blower motor M thereby providing electrical power to the motor. As the humidity of the air passing humidity sensor 204 changes, the resistance of the sensor changes causing a change in the charge time of capacitor C3. If the humidity of the air increases, the resistance of sensor 204 decreases thereby causing capacitor C3 to charge faster which in turn causes conduction of diac 214 and triggering of triac 212 earlier in the AC waveform. Triggering triac 212 earlier in the AC waveform provides an increased conduction period for electrical current to flow to blower motor M with a resultant increase of its speed and consequent increase of air flow. Increasing the air flow through the dehydrator tends to reduce the relative humidity at the humidity sensor. Electrical feedback through control 198 continues until the desired stable humidity is achieved.

To reduce the dehydrator air flow to a level satisfactory for the use of a given number of shelves or a single shelf, micro-switches 28 are made to open as the damper vanes 180 are closed to channel air through selected shelves. As a micro-switch opens, resistor R3 is taken out of the parallel circuit thereby increasing the resistance in the charge path of C3 causing it to charge at a slower rate which in turn delays the conduction time of diac 214 and triggering of triac 212 relative to the input AC waveform. Triggering triac 212 later in the waveform provides a reduced conduction period for electrical current to flow to blower motor M thereby decreasing the blower motor speed and reducing the air flow.

Transformer T and full wave bridge rectifier B provide a source of direct current to power humidity indicator 206. Indicator 206 is caused to vary with resistance changes in humidity sensor 204 as it senses humidity changes in the air flowing out of the dehydrator thereby providing a visual indication of the humidity level within the dehydrator. Capacitor C5 connected across the output of the bridge rectifier is a filter capacitor. Potentiometer 216 is for compensating and calibrating purposes. Resistor R1 and capacitor C4 serve to aid in turning off triac 212 while resistor R4 is a current limiting resistor to protect the humidity indicator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A dehydrator for home utilization comprising:
 a cabinet having a food access door and defining influent air passageway means, air distribution means, a dehydrating enclosure and effluent air pathway means;
 blower means for continuously displacing air from the surrounding atmosphere seriatim through the passageway means, the air distribution means, the dehydrating enclosure and the pathway means;
 heating means disposed within the passageway means for elevating the temperature of influent air being displaced therethrough;
 an electrical control system comprising a thermostat disposed within the cabinet which connects to and regulates the heating means to cause air temperature not to exceed 145° F.;

a plurality of shelf supports attached to the interior of the cabinet;

a plurality of removable shelves, each resting in vertically spaced relation one to the next upon said shelf supports within the dehydrating enclosure, the space between adjacent shelves comprising a horizontal corridor for heated air to pass across food resting upon the top of the lower of said adjacent two shelves to dry the same; and a plurality of selectively settable air flow control means disposed within the dehydrating enclosure to respectively determine the amount of air from the air distribution means permitted to reach each horizontal corridor.

2. A dehydrator according to claim 1 wherein the influent air passageway means are disposed at one vertical wall of the cabinet and comprise a constricted conduit in which the heating means are disposed and a progressively divergently enlarged confinement having air diffusing means therein.

3. A dehydrator according to claim 1 wherein the air distribution means comprise a hollow chamber spanning essentially the entire bottom of the cabinet.

4. A dehydrator according to claim 1 wherein the blower means are disposed upstream of the passageway means and comprise a variable speed motor to control the rate at which air is displaced through the dehydrator.

5. A dehydrator according to claim 4 wherein the electrical control system comprises a humidity sensor located within the cabinet downstream of the horizontal corridors which connects to and regulates the rate of dehydration by controlling the speed of the variable speed motor of the blower means.

6. A dehydrator according to claim 1 wherein the effluent air pathway means comprise a chimney extending above the top of the cabinet and a vertical channel below the chimney, the vertical channel being in fluid communication with each horizontal corridor.

7. A dehydrator according to claim 1 wherein at least some of said shelves are porous, accommodating rise of air therethrough.

8. A dehydrator according to claim 1 wherein at least some of said shelves are non-porous, thereby channeling air solely parallel to each horizontal corridor between shelves receiving hot air.

9. A dehydrator for home utilization comprising:

a cabinet having a food access door and defining influent air passageway means, air distribution means, a dehydrating enclosure and effluent air pathway means;

blower means for continuously displacing air from the surrounding atmosphere seriatim through the passageway means, the air distribution means, the dehydrating enclosure and the pathway means;

heating means disposed within the passageway means for elevating the temperature of influent air being displaced therethrough;

an electrical control system comprising a thermostat disposed within the cabinet which connects to and regulates the heating means to cause air temperature not to exceed 145° F.;

a plurality of shelf supports attached to the interior of the cabinet;

a plurality of removable shelves, each resting in vertically spaced relation one to the next upon said shelf supports within the dehydrating enclosure, the space between adjacent shelves comprising a horizontal corridor for heated air to pass across food resting upon the top of the lower of said adjacent two shelves to dry the same;

selectively settable air flow control means disposed to determine the amount of air from the air distribution means permitted to reach each horizontal corridor; and the air flow control means comprise a plurality of rotatable damper means, one disposed adjacent each shelf, each damper means having manual selectively settable means for placing said damper means in an orientation between off and on thereby diverting all or a desired part of air striking said damper means to the adjacent horizontal corridor.

10. A dehydrator according to claim 9 wherein said air flow control further comprises juxtaposed apertured plates disposed at the air intake to each horizontal corridor, one said plate being displaceable in respect to the other whereby apertures of each may be aligned or misaligned in whole or in part to control the amount of air entering said horizontal corridor.

* * * * *